United States Patent
Navon et al.

(10) Patent No.: US 11,269,645 B2
(45) Date of Patent: Mar. 8, 2022

(54) STORAGE SYSTEM AND METHOD FOR IMPLEMENTING AN ENCODER, DECODER, AND/OR BUFFER USING A FIELD PROGRAMMABLE GATE ARRAY

(71) Applicant: Western Digital Technologies, Inc., San Jose, CA (US)

(72) Inventors: Ariel Navon, Revava (IL); Ran Zamir, Ramat Gan (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 206 days.

(21) Appl. No.: 16/815,860

(22) Filed: Mar. 11, 2020

(65) Prior Publication Data

US 2021/0286623 A1  Sep. 16, 2021

(51) Int. Cl.
| | |
|---|---|
| *G06F 11/00* | (2006.01) |
| *G06F 9/38* | (2018.01) |
| *G06F 9/445* | (2018.01) |
| *G06F 11/07* | (2006.01) |

(52) U.S. Cl.
CPC ........ *G06F 9/3836* (2013.01); *G06F 9/44505* (2013.01); *G06F 11/076* (2013.01); *G06F 11/0727* (2013.01)

(58) Field of Classification Search
None
See application file for complete search history.

(56) References Cited

U.S. PATENT DOCUMENTS

| | | | |
|---|---|---|---|
| 5,987,181 A * | 11/1999 | Makiyama | ......... H04N 21/2662 358/426.12 |
| 8,341,332 B2 | 12/2012 | Ma et al. | |
| 9,563,382 B2 | 2/2017 | Hahn et al. | |
| 10,108,371 B2 | 10/2018 | Nimmagadda et al. | |
| 10,116,311 B2 | 10/2018 | Martin et al. | |
| 2014/0229710 A1* | 8/2014 | Muff | ...................... G06F 9/3836 712/205 |
| 2015/0349807 A1* | 12/2015 | Vernon | ............. H03M 13/6577 714/774 |
| 2016/0043743 A1* | 2/2016 | Vojcic | ............... H03M 13/6541 714/755 |

(Continued)

FOREIGN PATENT DOCUMENTS

| | | |
|---|---|---|
| CN | 109871337 A | 11/2019 |
| KR | 10 2019 0133555 A | 12/2019 |

OTHER PUBLICATIONS

International Search Report dated Dec. 3, 2020 for International Application No. PCT/US2020/037749.

(Continued)

*Primary Examiner* — Mujtaba M Chaudry
(74) *Attorney, Agent, or Firm* — Crowell & Moring LLP

(57) ABSTRACT

A storage system and method for implementing an encoder, decoder, and/or buffer using a field programmable gate array are provided. In one embodiment, a storage system is provided with a field programmable gate array and a memory that stores sets of instruction code for the field programmable gate array. The sets of instruction code can be for different error decoder implementations, for providing an additional encoder and/or decoder, or for implementing a host memory buffer or a controller memory buffer.

20 Claims, 15 Drawing Sheets

(56) References Cited

U.S. PATENT DOCUMENTS

| | | |
|---|---|---|
| 2016/0092300 A1* | 3/2016 | Lei .................... G06F 11/1068 |
| | | 714/764 |
| 2017/0262332 A1 | 9/2017 | Barndt et al. |
| 2018/0052766 A1* | 2/2018 | Mehra .................. G06F 3/0679 |
| 2018/0167086 A1* | 6/2018 | Tai .................... H03M 13/3753 |
| 2018/0341606 A1 | 11/2018 | Bolkhovitin et al. |
| 2018/0373591 A1 | 12/2018 | Barndt et al. |
| 2019/0273511 A1* | 9/2019 | Usatyuk ............. H03M 13/036 |
| 2019/0294350 A1 | 9/2019 | Hahn et al. |

OTHER PUBLICATIONS

Written Opinion dated Dec. 3, 2020 for International Application No. PCT/US2020/037749.

* cited by examiner

STORAGE SYSTEM AND METHOD FOR IMPLEMENTING AN ENCODER, DECODER, AND/OR BUFFER USING A FIELD PROGRAMMABLE GATE ARRAY

BACKGROUND

A storage system can be configured with an encoder for encoding error correction code bits for data to be stored in a memory of the storage system, as well as a decoder for decoding error correction code bits for data read from the memory. Some storage systems implement a controller memory buffer or a host memory buffer.

DETAILED DESCRIPTION

By way of introduction, the below embodiments relate to a storage system and method for implementing an encoder, decoder, and/or buffer using a field programmable gate array. In one embodiment, a storage system is provided with a field programmable gate array and a memory that stores sets of instruction code for the field programmable gate array. The sets of instruction code can be for different error decoder implementations, for providing an additional encoder and/or decoder, and/or for implementing a host memory buffer or a controller memory buffer. Other embodiments are possible, and each of the embodiments can be used alone or together in combination. Accordingly, various embodiments will now be described with reference to the attached drawings.

Figure 1A:
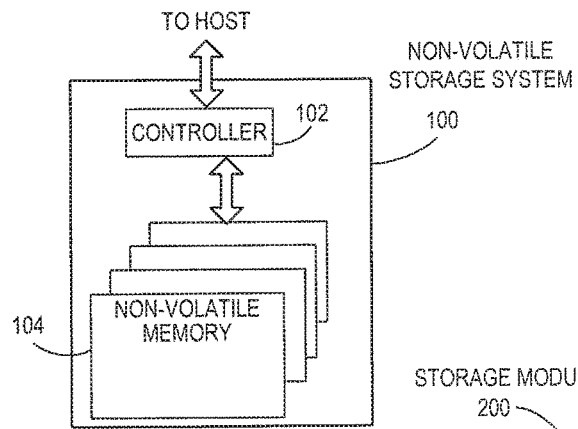
FIG. 1A is a block diagram of a non-volatile storage system of an embodiment.
Figure 1B:
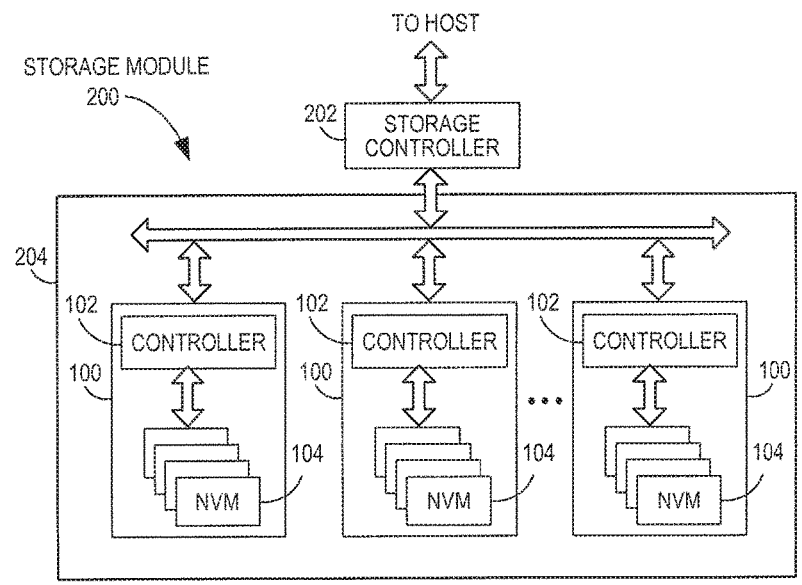
FIG. 1B is a block diagram illustrating a storage module of an embodiment.
Figure 1C:
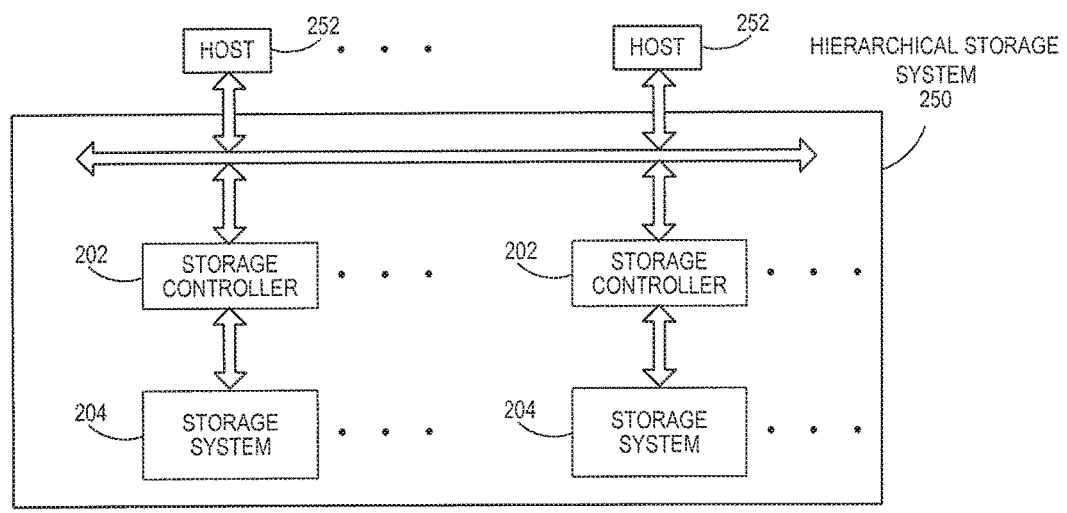
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry tor managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be lead/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory ceils and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interlaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2:
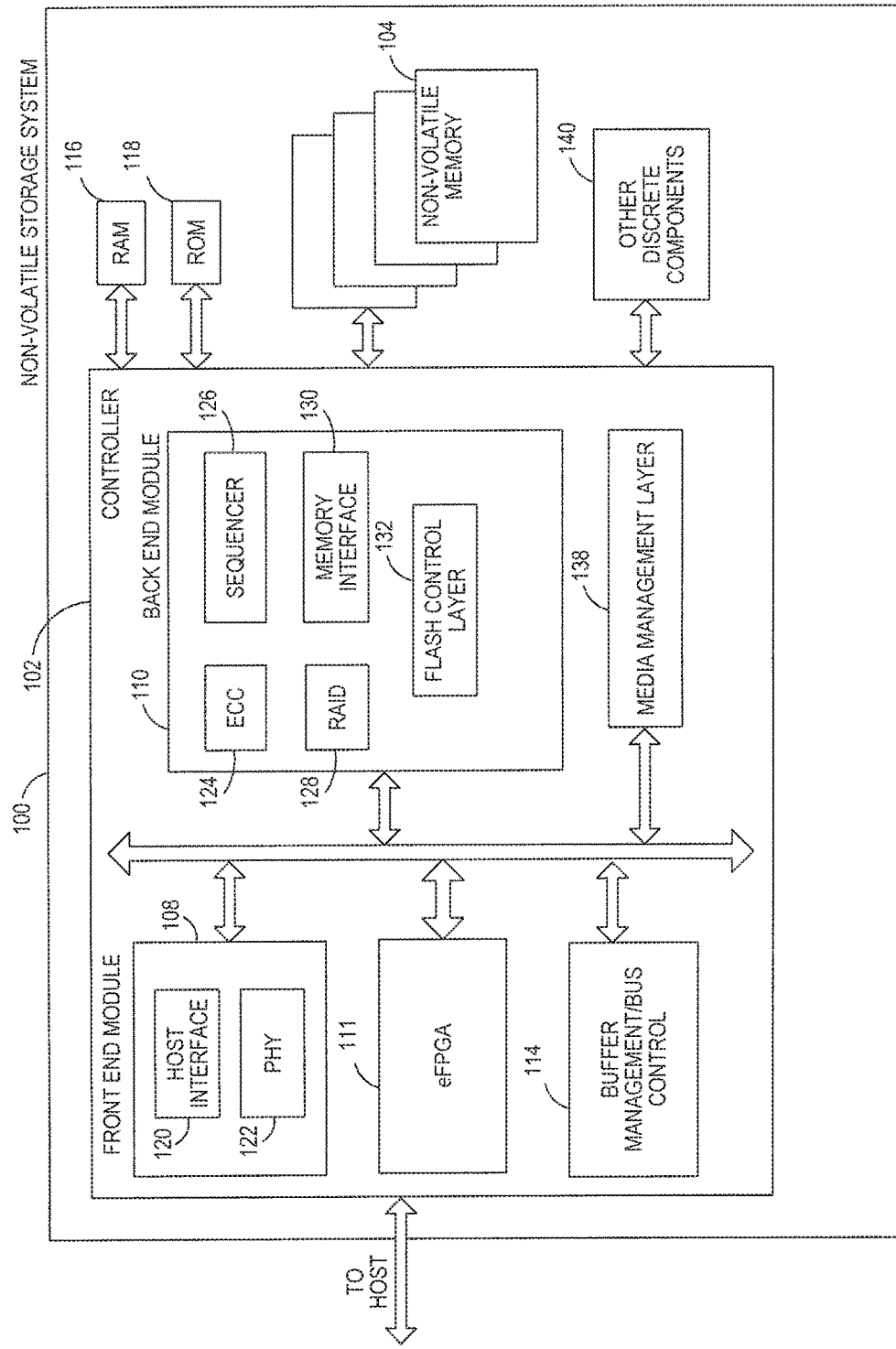
FIG. 2 is a block diagram illustrating components of the controller of the non-volatile storage system illustrated in FIG. 1A according to an embodiment.

FIG. 2 is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include an embedded field programmable gate array (eFPGA) 111, which is discussed in more detail below. In some embodiments, the BCC module 124 is at least partially embedded in the eFPGA 111.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2 as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or mom of the physical layer interface 122, RAID module 128, media management layer 138 and buffer management/bus controller 114 are optional components that are not necessary in the controller 102.

Figure 3:
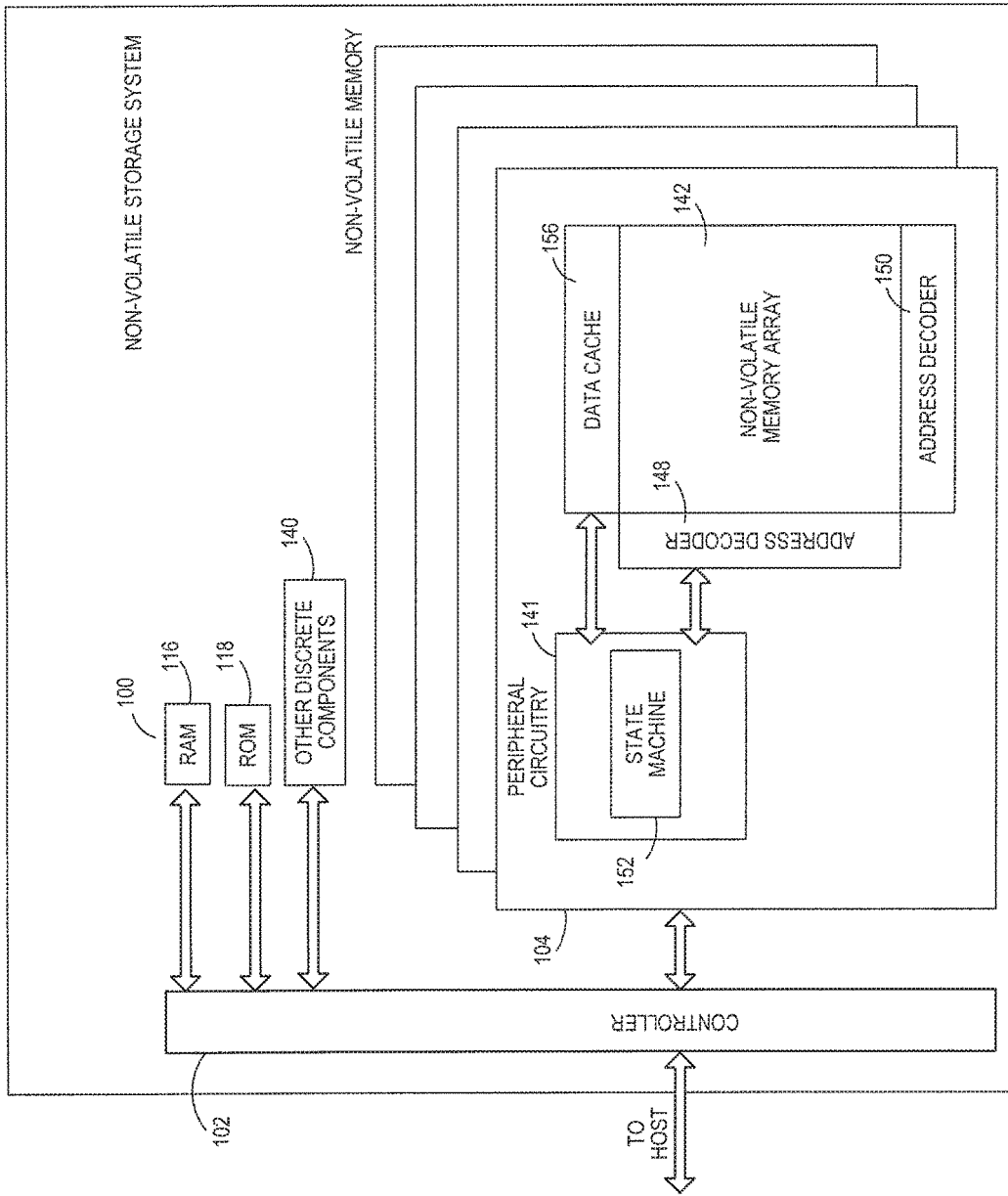
FIG. 3 is a block diagram illustrating components of the non-volatile storage system illustrated in FIG. 1A according to an embodiment.

FIG. 3 is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Modern storage systems usually include an iterative soft decoder, such as a low-density-parity-check (LDPC) error correction code (ECC) engine, which usually includes several internal hardware cores to support different bit error rate (BER) levels of stored data. For example, a storage system cm include three decoding engines (sometimes referred to herein as gears or algorithms) inside an LDPC hardware module: a first engine targeted to provide a first level of correction capability, a second engine targeted to provide a second level of additional correction capability, and a third engine targeted to provide a third level of even more correction capability.

The different decoding cores of an LDPC ECC decoder incorporate a trade-off between correction capability on one hand and consumed operation power and decoding duration on the other hand. The frequency of usage of the different ECC cores changes throughout the storage device's lifetime (measured, for example, by program/erase counts). As the storage conditions degrade (e.g., as evidence by an increase in the BER) during the lifetime of the device, so does the usage of the different decoder cores.

As the throughput requirement of the storage system increases, the usage of multiple decoding engines increases. For example, some consumer solid state drives (cSSD) have various numbers of the first, second, and third engines, while some enterprise solid state drives (eSSD) have other various numbers of the first, second, and third engines. Next generation storage systems can have even further variations.

The gains in cost and power consumption with a multi-decoder approach are considerable. Further, the success probability of each decoding gear can vary as a function of BER. In this way, different BERs can dictate the usage of different decoding gears. For example, at the beginning of life, the first engine may be appropriate, but, as the memory matures, the BER increases and so does the usage percentage of the second and third engines To address this situation, in one embodiment, an adaptive storage decoder hardware design can be based on an embedded field programmable gate array (eFPGA) implementation. In general, an eFPGA integrates an FPGA as a part of an application-specific integrated circuit (ASIC) system on chip (SoC). The eFPGA technology provides flexible hardware programmability of an FPGA with the performance and cost benefits of an ASIC SoC. While an embedded FPGA is used in some of these examples, it should be understood that a non-embedded FPGA can be used.

Figure 4:
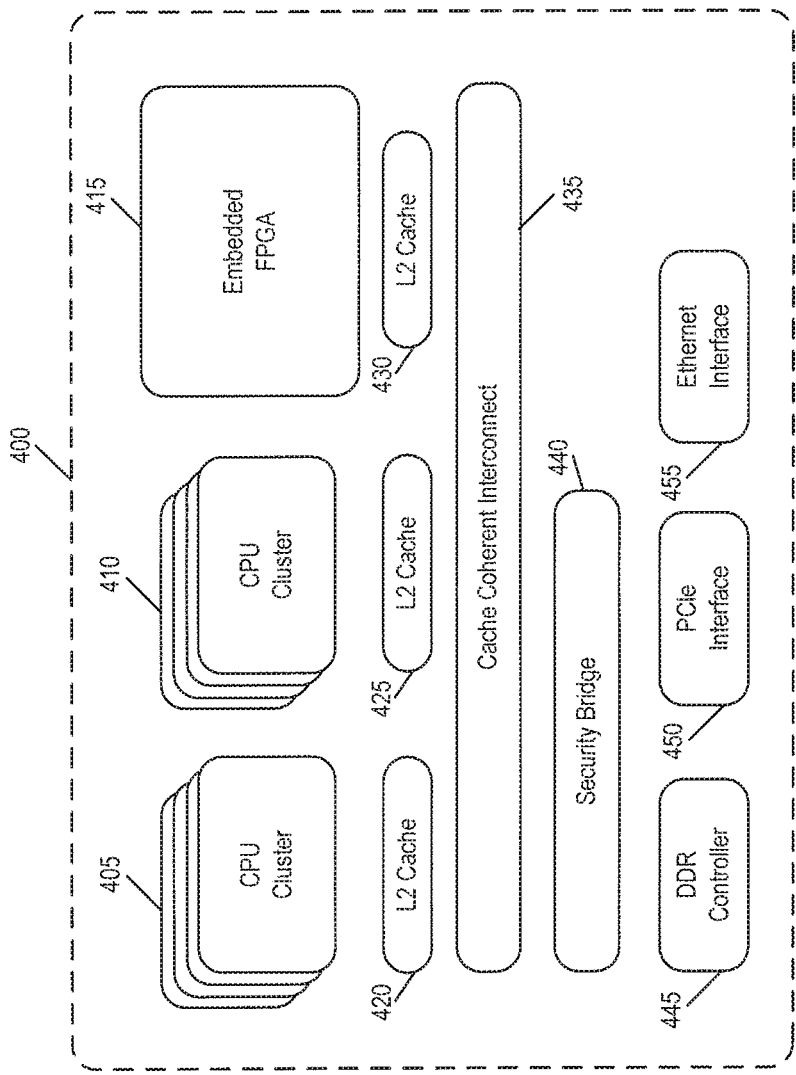
FIG. 4 is a block diagram of an example of a system on chip (SoC) embedded field programmable gate array (eFPGA) system.
Figure 5:
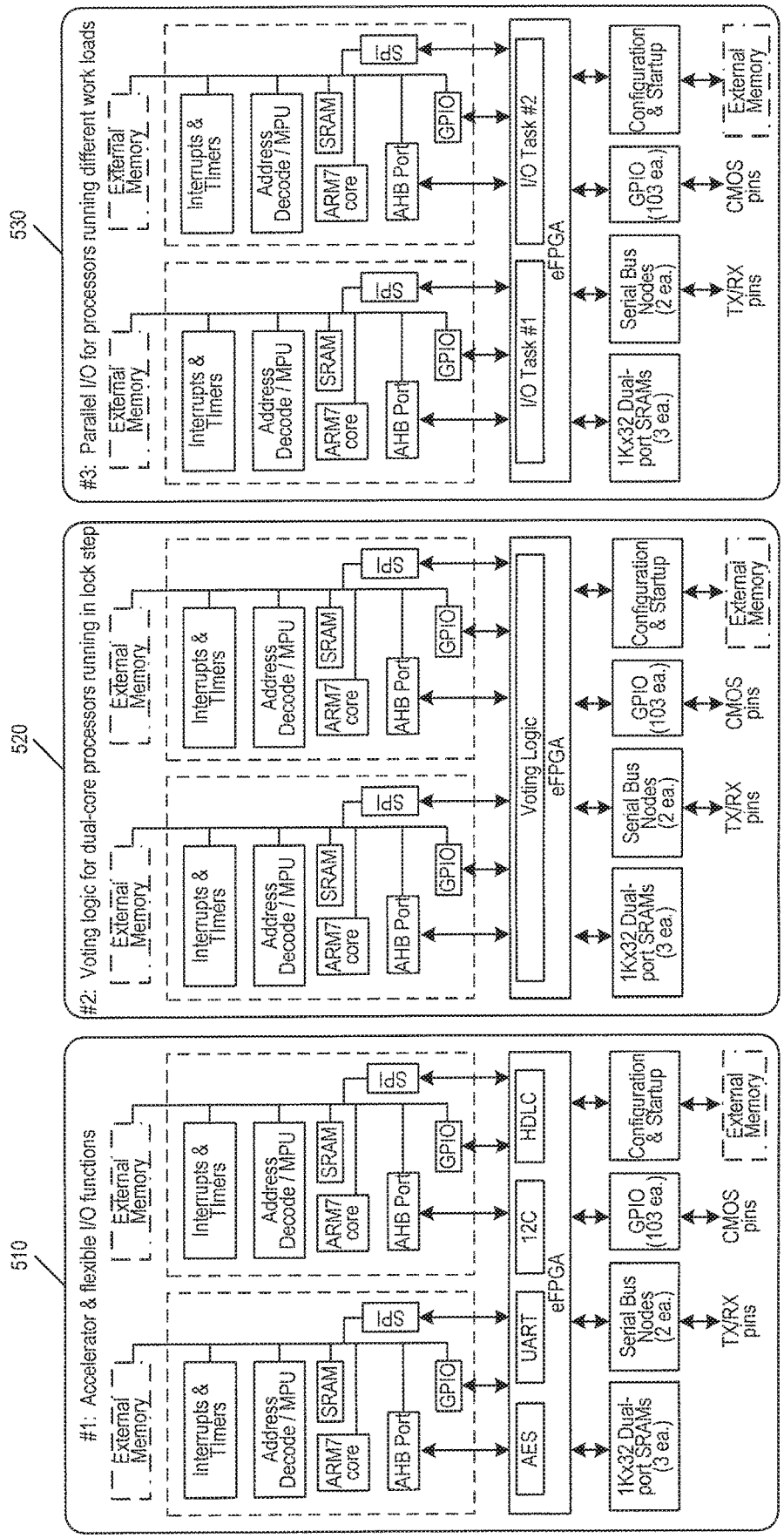
FIG. 5 is a block diagram of example use cases of an eFPGA.

FIG. 4 is a block diagram of an example of an SoC eFPGA system 400. As shown in FIG. 4, the system 400 comprises two central processing unit (CPU) clusters 405, 410, an eFPGA 415, three level 2 (L2) caches 420, 425, 430, a cache coherent interconnect layer 435, a security bridge 440, a double-data-rate (DDR) controller 445, a peripheral component interconnect express (PCIe) interface 450, and an Ethernet interface 455. This SoC 400 can be used with programmable acceleration.

FIG. 6 is a block diagram of example use cases of an eFPGA. This figure demonstrates the hardware programmability flexibility of an eFPGA system that allows programming the FPGA component inside the SoC to different hardware functionalities. For example, in one use case 510, the eFPGA system is used as an accelerator and to provide flexible input/output (I/O) functions. In another use case 520, the eFPGA system is used as voting logic for dual-core processors running in lock step. In yet another use case 530, the eFPGA system is used to provide parallel I/O processors running different workloads.

The main advantage of employing an FPGA on an SoC is related to the FPGA's flexibility while still preserving the performance of the SoC. The direct advantages of employing FPGAs are related to shortening time-to-market (TTM) and flexible hardware bug support.

Returning to the discussion of decode engines, the second and third decoding modes are used very rarely for a fresh storage device and are practically redundant at beginning of life of the memory. However, as the classic ASIC hardware design is fixed, the LDPC decoding solution may be dimensioned according to all conditions: first decoders for beginning of life (BOL) and second/third decoders for end of life (EOL). Depending on the product requirements, either t wo sets of decoders may be needed or a compromise is made sacrificing power efficiency at BOL (fewer first decoders) or performance at BOL (fewer third decoders). Storage device performance could be dramatically accelerated if the hardware design amid be dynamically adapted according to a typical BER (or an estimate of tire BER (e.g., syndrome weight), which corresponds to the device's age. However, current storage system use a fixed hardware design of an LDPC ECC decoder, which includes the same hardware modules (e.g., different decoding cores) to support the worst case conditions both at BOL and EOL in terms of performance and correction capability.

In one embodiment, a dynamically adaptive storage decoder hardware design is provided utilizing an embedded-FPGA SoC implementation. This embodiment utilizes the eFPGA capabilities in a unique manner. As mentioned above, the common use case of an eFPGA is targeted to shortening the time to market and improving the hardware-bugs support capabilities. However, this embodiment can be used to incorporate a different concept which utilizes the eFPGA to provide flexible hardware design along the device's lifetime (even in the steady-state development stage of a product). In one embodiment, the FPGA part of the SoC can be configured to implement a different combination of decoding cores in accordance with the device's age (e.g., as measured by the program/erase cycles level) to tailor the decoder characteristics to the memory characteristics to achieve optimized performance and power consumption.

In one embodiment, a flexible hardware design of an LDPC ECC module by an eFPGA-based adaptive configuration of different decoding mode sub-engines is provided. A flexible hardware design of the storage device LDPC core can be provided based on a typical BER level (in accordance with the device's life stage).

As mentioned above, the expensive FP-decoding mode (i.e., high power consumption with long decoding duration) is used very rarely for fresh storage devices. However, as the classic ASIC SoC hardware design is fixed, the LDPC decoding core must include all decoding modules, as it needs to operate well with the same hardware also at end of life (EOL). In contrast, this embodiment defines several hardware mode configurations that suits different BER levels in accordance to the age of the storage device, such that there are more first decoding cores at beginning of life, more second decoding cores at mid-life, and more third decoding cores at end of life.

For each BER level, engines and their parallelism can be defined according to the expected BER and memory conditions to optimize performance and power. By tailoring the decoder architecture, the number of each engine type, and the parallelism of each engine to memory conditions, this embodiment can optimize the decoder performance and power consumption. In other words, this optimization can result in higher performance and lower power compared to a non-adaptive system.

Figure 6A:
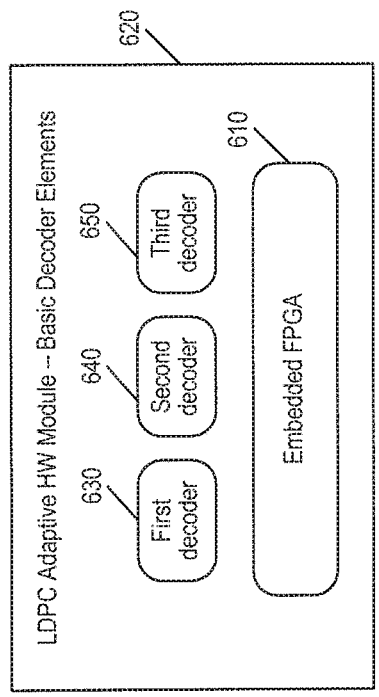
FIGS. 6A-6D are block diagrams of an adaptive storage error correction code (ECO) decoder hardware design of an embodiment implemented by an eFPGA.
Figure 6D:
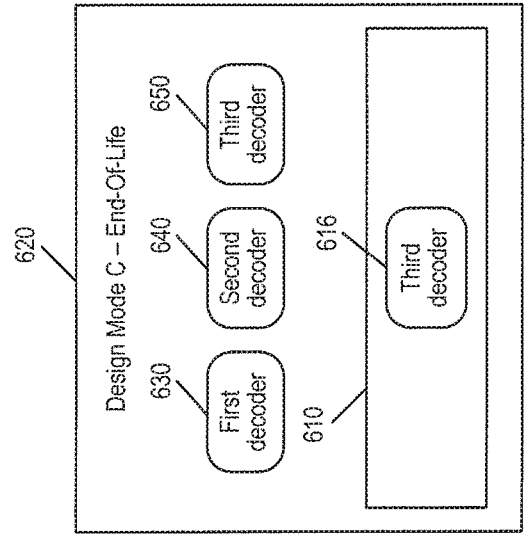

FIGS. 6A-6D) are block diagrams of an adaptive storage error correction code (ECC) decoder hardware design of an embodiment implemented by an eFPGA. These figures will be discussed in conjunction with the flow chart 700 in FIG. 7, which shows the transition of the eFPGA hardware design between different storage fife stages. As shown in FIG. 6A, the module 620 comprises a first decoder 630, a second decoder 640, and a third decoder 650, as well as an eFPGA 610. In this embodiment, the eFPGA 610 is programmed, based on the life stage of the storage system 100, to implement one or more additional decoders.

Figure 6C:
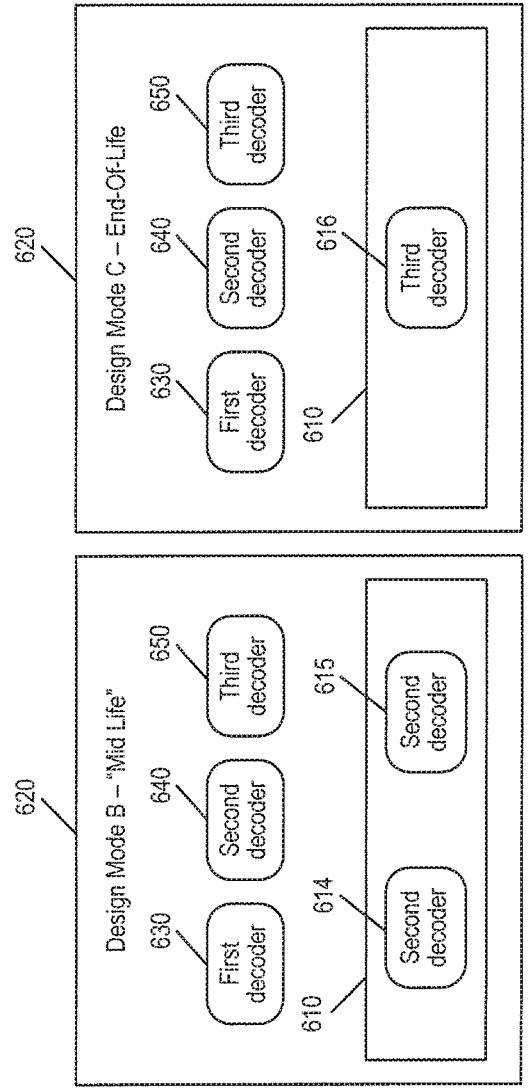
Figure 6B:
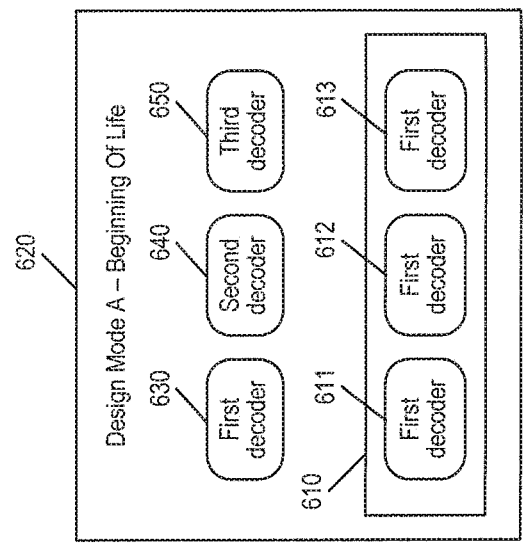
Figure 7:
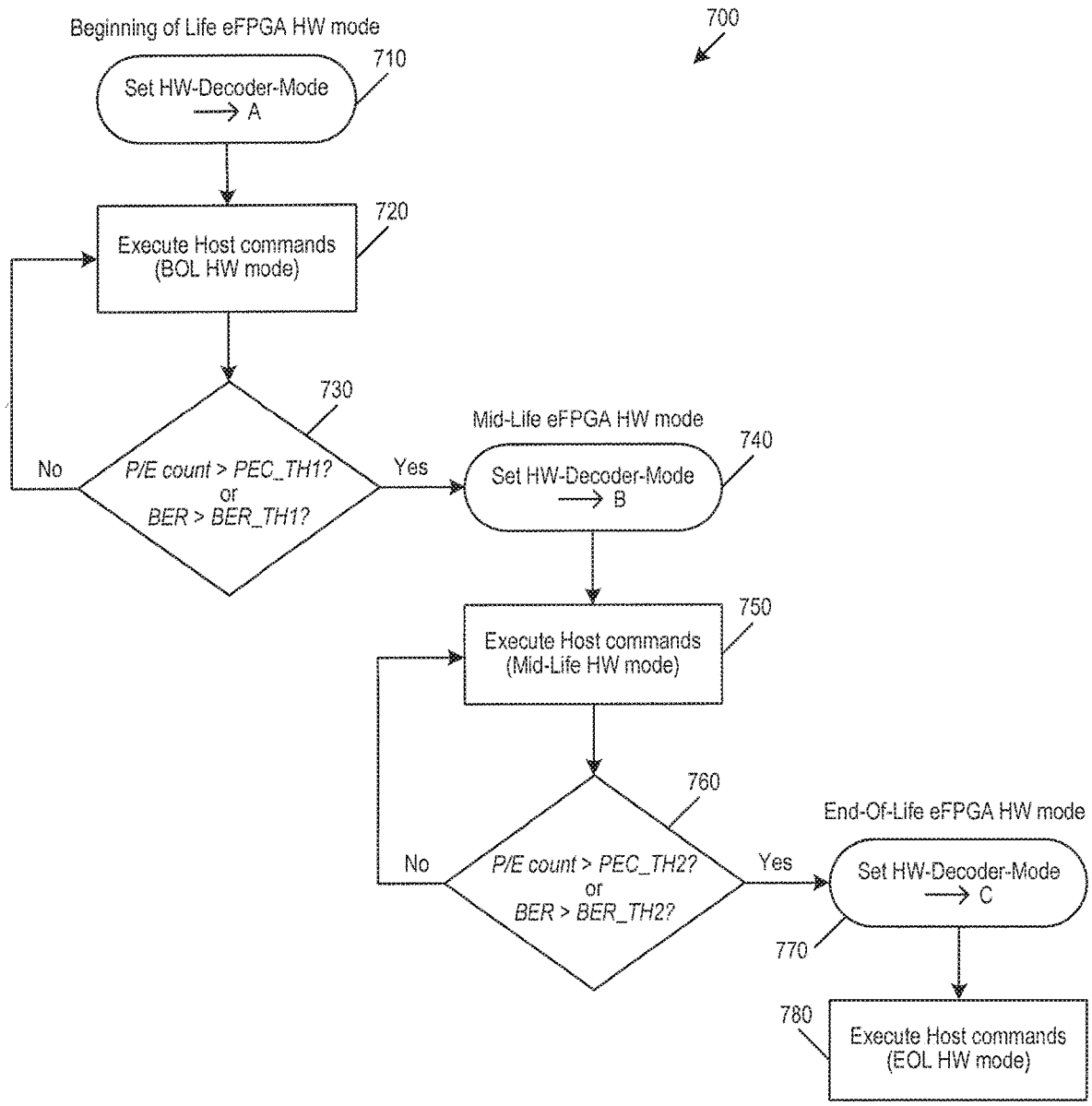
FIG. 7 is a flow chart of a method of an embodiment for adapting a storage ECC decoder for different storage life states.

For example, as shown in FIG. 6B and in act 710 in FIG. 7, at the beginning of life, the module is programmed to "Design Mode A," in which the eFPGA 610 is programmed to implement three additional first decoders 611, 612, and 613. This is an ultrafast decoding hardware mode that accelerates decoding parallelism at beginning of life. In this mode, the controller 102 executes host commands (act 720) and monitors the aging of the storage system 100 to see if the decoding mode needs to be changed. For example, as shown in act 730 in FIG. 7, the controller 102 can determine if a program/erase count (PEG) or a bit error rate (BER) is above a threshold. If it is, that signifies that the memory has aged to mid-life where a different error protection scheme would likely be appropriate. In that case, the controller 102 implements Design Mode B (act 740). As shown in FIG. 6C, in Design Mode B. the eFPGA 610 implements two second decoders 614, 615, as using second decoding as the decoding gear is appropriate for mid-life.

The controller 102 continues to execute commands (act 750) and determine if the memory has age to end of life (e.g., by determining if the PEC or BER is greater than a second threshold) (act 760). When the memory is at end of life, the controller 102 sets the hardware decoder to Design Mode C (act 770), in which the eFPGA 610 implements a third decoder 616 (see FIG. 6D), and the controller 102 executes host commands in this mode (act 780).

Figure 8:
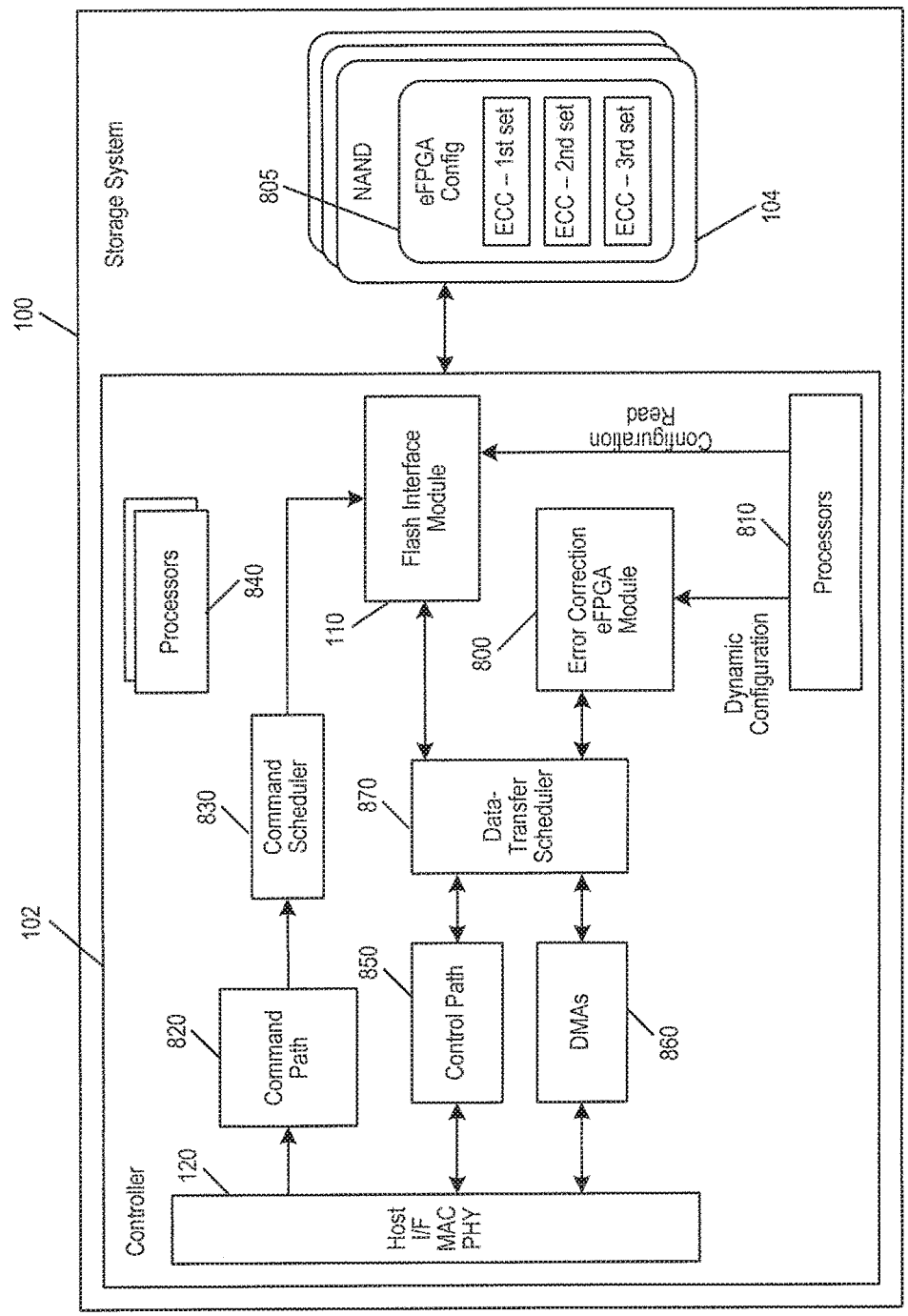
FIG. 8 is a block diagram of a storage system of an embodiment.

FIG. 8 is a block diagram of a storage system 100 of an embodiment that is directed to these features. As shown in FIG. 8, foe storage system 100 comprises a controller 102 and a memory (here, NANO) 104. The controller 102 comprises an error correction eFPGA module 800, which can take a form similar to the module 620 in FIG. 6A. The eFPGA module 800 contains an eFPGA that can be programmed by a processor 810 with instructions read from an eFPGA configuration area/file 805 in the memory 104. For example, the eFPGA configuration area/file 805 in foe memory 104 can store three different sets of instruction code to implement Design Modes A-C discussed above. In operation, based on the average BER or PEC of the memory 104, the processor 810 would issue a configuration read command to the memory 104 via the Flash interface module 110 to fetch appropriate set of instruction code for the desired configuration and then dynamically configure the eFPGA module 800 with the read instructions code. The other components of the controller 102 (e.g., the command path 820, the command scheduler 830, other processors 840, a control path 850, direct memory access (DMA) modules 860, and a data transfer scheduler 870) would operate as they normally do.

In another embodiment, the parallelism of each ECC engine changes as a function of the average BER. For instance, when having the best BER, the parallelism of each ECC engine is low, but there are many ECC engines. After having worse BER, the controller 102 may decrease the number of ECC engine but increase the parallelism in each one of them.

There are several advantages associated with these embodiments. For example, adapting the decoder architecture to the memory conditions during the life time of the product can help ensure optimal performance and power consumption. As another example, reconfiguring the eFPGA decoder for modules that are used only during exception/maintenance can help reduce the cost of the controller 102 and/or mitigate the extra cost of the eFPGA.

In another embodiment, an eFPGA can be used for adaptive encoding and decoding channels. An LDPC ECC engine can include different channels of encoding and decoding. The encoding channel is operated during the write path where the parity redundancy data is calculated, whereas the decoding channel is operated during the read path where an iterative ECC scheme is operated using a designated decoder hardware in order to correct erroneously flipped bits (e.g., by implementing a message passing algorithm, such as Belief-Propagation).

As the encoding and decoding operations are strictly different from each other (e.g., encoding is a deterministic operation in nature, whereas the decoding operation is stochastic), the common involved hardware implementation results in different hardware cores for the encoder and the decoder. Nevertheless, in order to enhance performance of decoding and/or encoding, it is a valid option to add several copies of each of the encoder/decoder cores in order to allow parallel processing of larger data chunks. This is shown in the block diagram 900 in FIG. 9.

Figure 9:
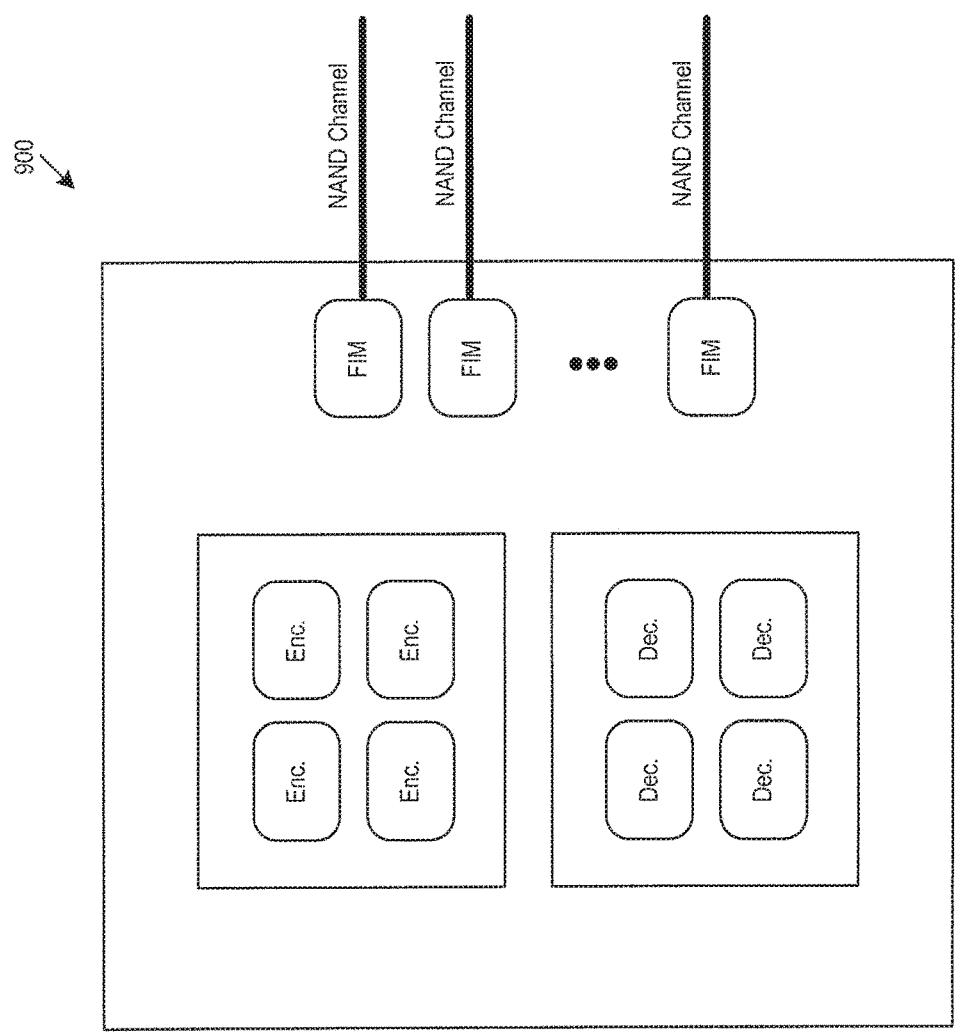
FIG. 9 is a block diagram of a storage system of an embodiment having a fixed partition of error correction code (ECC) encoder and decoder cores.

FIG. 9 shows a fixed partition of ECC encoder and decoder cores, which is referred to as a balanced system because it has the same number of encoders and decoders.

However, it may be beneficial to change the nominal balance because (1) product requirements may vary, some more write intensive and some more read intensive while using the same controller, and (2) according to the number of dies, there may be great asymmetry in NAND program/read times, so different configurations of the same product may require different partitions of encoder/decoder cores.

As the common practice to implement encoder and decoder channels is to have a fixed hardware design of one or more encoding cores and one or more decoding cores, the hardware capabilities of such ECC engines are limited by the available design of the decoding/encoding partitions. Such inflexibility means that the system is not able to adapt its performance according the specific host workflow and/or according to the required current performance.

For example, if a write-intensive application is operated regularly on a certain storage device (e.g., for an event data recorder log), the performance of the device, which was planned for general purpose workflows, would be limited by the write path. While if the same storage device is operated in a read-intensive mode (e.g., for three-dimensional and/or high-definition maps in the memory of an autonomous vehicle), then it is limited by the read path. As the memory can only perform one operation at a time (either program or sense), it is inefficient to have a fixed partition of encode/decode cores (even though multiple dies are used, it is difficult and sometimes impossible to maintain simultaneous read/write). It may be desired to allow an ECC engine to have the capability to adaptively change the allocation of its internal hardware resources between the decoding and encoding channels according to the specific host/application workflow and/or according to current versus the required read/write performances.

As mentioned above, the previous approach for the hardware design of encoding/decoding channels of an ECC engine of storage devices is a fixed partition of one or more encoding cores and one or more decoding cores with no adaptation capabilities between encoding/decoding channels according to specific host workflow and/or according to the required current performance. In contrast, in one embodiment, the ECC engine has a flexible partition of hardware resources between the encoding and decoding channels using eFPGA technology in an optimized manner according to the current storage device performance and the specific user typical workflows. This embodiment further includes tracking of the statistical performance of the storage memory in order to adaptively prioritize the encoding/decoding resource allocation and optionally also the tracking of the specific host/application typical workflows for the same purpose. The adaptability of the encoding/decoding channels is allowed in one embodiment by an embedded-FPGA module.

Figure 10A:
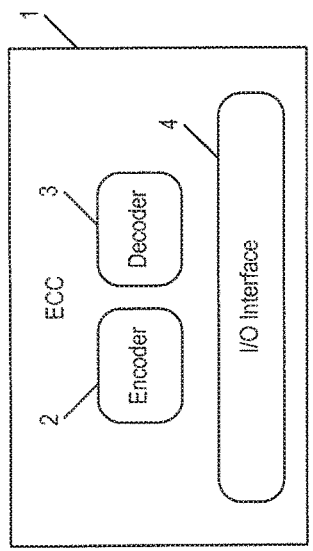
FIG. 10A is block diagram of a prior art ECC core.
Figure 10C:
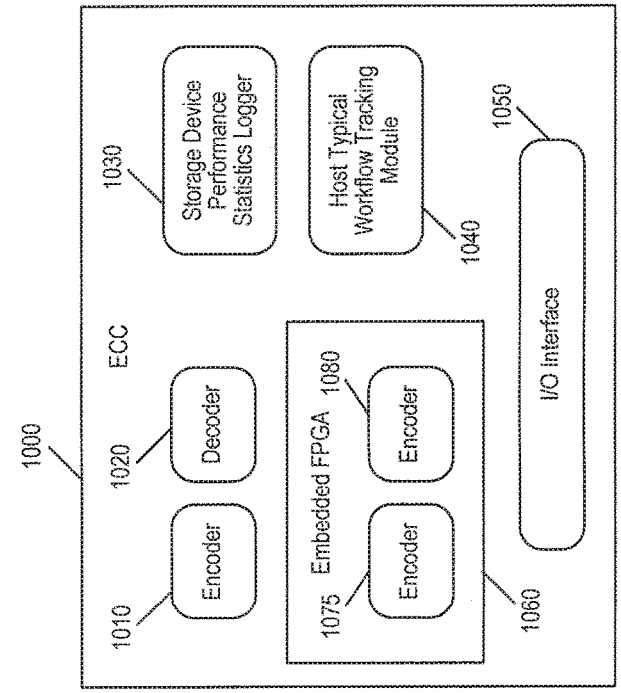
FIGS. 10B and 10C are block diagrams of an ECC core of an embodiment.
Figure 10B:
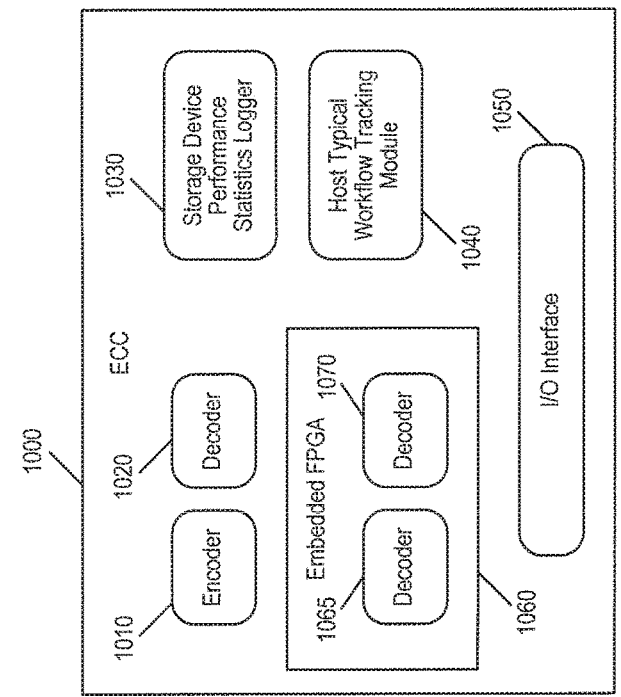

Returning to the drawings, FIG. 10A is a block diagram of a prior art ECC core design 1. As shown in FIG. 10A, this design 1 comprises a single encoder 2, a single decoder 3, and an I/O interface 4. In contrast to this fixed design, the ECC module of this embodiment provides adaptive encoding and decoding hardware channels. For example, as shown in FIGS. 10B and 10C, the ECC module 1000 of this embodiment comprises an encoder 1010, a decoder 1020, a storage device performance statistics logger 1030, a host typical workflow tracking module 1040, an I/O interface, and an embedded FPGA 1060. The embedded FPGA 1060 can be programmed to implement additional encoders and/or decoders. For example, in FIG. 10B, the embedded FPGA 1060 is programmed to implement two additional decoders 1065 (which is a design that enhances decoding), whereas in FIG. 10C, die embedded FPGA 1060 is programmed to implement two additional encoders 1075, 1080 (which is a design that enhances encoding).

In one embodiment, there are two methods for adapting the eFPGA module for either encoding- or decoding-intensive workloads; an offline adaptation and an on-line adaptation. In the offline adaptation, the partition of encoding/decoding is adapted according to the product requirements (e.g., a specific product identifier (stock keeping unit (SKU)), a configuration, and the number of connected dies). This offline adaptation of the eFPGA module for either decoding or encoding intensive workloads can be performed during initialization after a power-on resent (POR).

Figure 11:
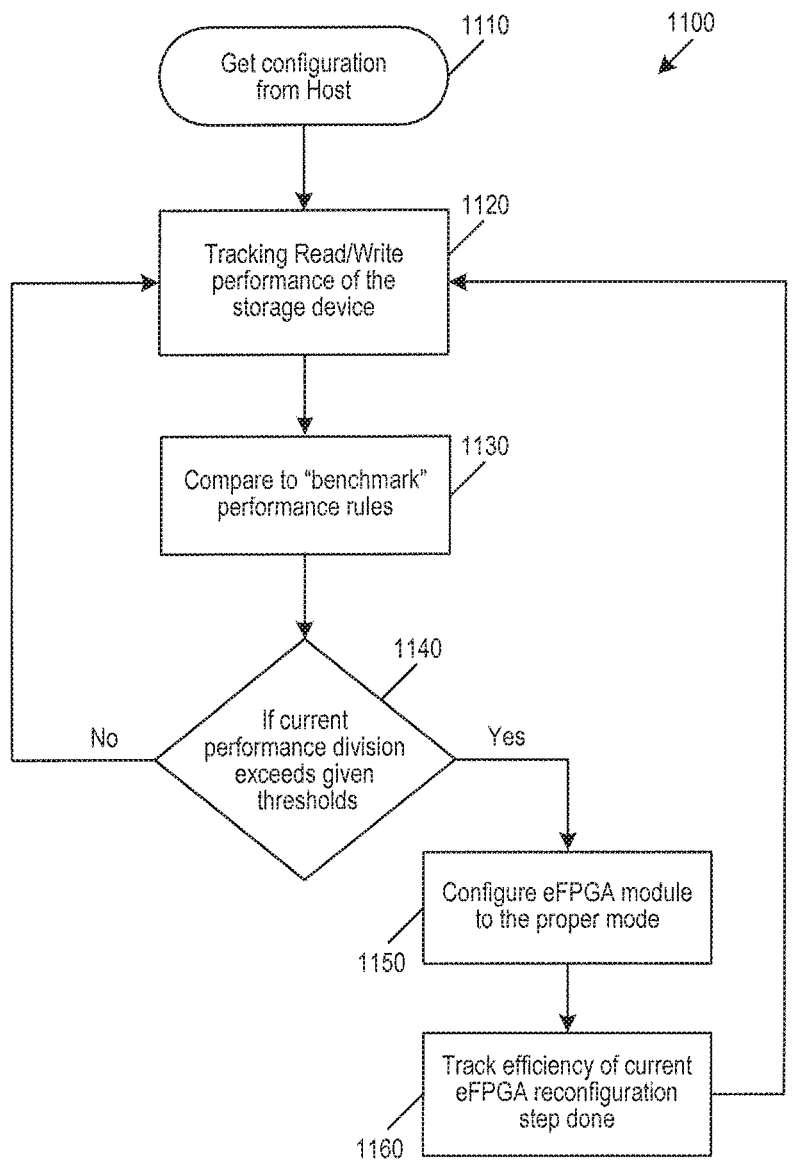
FIG. 11 is a flow chart of a method of an embodiment for adaptive encoding and decoding channels.

In contrast, an online adaptation can lie used to dynamically change the configuration over time. FIG. 11 is a flow chart 1100 of a method of an embodiment for online adaptation. As shown in FIG. 11, after configuration information is received from the host (act 1110), the read and write performances and the quality of service (QoS) of the storage device are tracked (act 1120). Other metrics can be tracked, such as, but not limited to, type of application, type of configuration, type of virtual host, queue depth, power conditions, and temperature conditions. The read/write performance is then compared to the relevant benchmark performance values (act 1130). These values can be either pre-defined or updated during the device's lifetime as an input from the user. This comparison check point can be initiated at pre-defined time intervals, according to user notice, or once an exception from an acceptable performance criteria is identified.

To make the hardware configuration decision, the controller 102 can compare the importance level for the read and write channels versus relevant thresholds (act 1140) and set the corresponding configuration of the eFPGA module in the controller 102 accordingly (act 1150). In one embodiment, the memory 104 stores a plurality of sets of pre-defined eFPGA configuration options, and a set of "if-else" conditions are associated in advance to decide about the proper hardware configuration mode. The effectiveness of the chosen eFPGA hardware configuration can be tracked and optionally reported to the host once required or else be used to update the decision rules of the previous step (act 1160).

In one embodiment, the eFPGA concept can be used for addressing burst operations. For instance, normally, one system may incorporate ten decoders and three encoders. However, if the device detects burst write operations that require extra encoder parallelism, the number of decoder can be dynamically decreased while increasing the number of encoders and have a performance/QoS boost for this burst operations. The storage device can detect burst operations in various ways, such as, but not limited to, through an on-line detection of many operations with the same attributes (e.g., read/write commands), a prediction of burst operations based on previous history or machine learning, host hints, and using a predictable latency mode.

Figure 12:
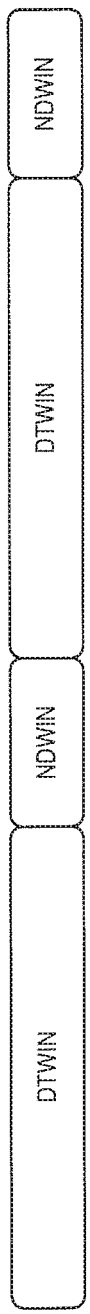
FIG. 12 is a diagram of deterministic and non-deterministic windows of an embodiment.

Regarding the predictable latency mode, in some systems, the workload is predictable as a function of time, and the predictable latency mode is used to achieve predictable latency for both read and write operations in NVMe devices. When an NVMe device is configured to operate in this mode, the namespaces in an NVM Set provide distinctive separate windows of operation for deterministic operation and for non-deterministic operation. The deterministic window (DTWIN) is the window of operation during which the NVM Set is able to provide deterministic latency for read and write operations. The Non-Deterministic Window (NDWIN) is the window of operation during which the NVM Set is not able to provide deterministic latency for read and write operations as a result of preparing for a subsequent deterministic window. An example action that may be performed in the Non-Deterministic Window includes a background operation on the non-volatile media. The current window that an NVM Set is operating in is configured by the host using the Predictable Latency Mode Window Feature or by the controller 102 as a result of an autonomous action. FIG. 12 depicts deterministic and non-deterministic windows that switch periodically. Die motivation is to increase the deterministic window duration and decrease the non-deterministic window duration as needed. In one embodiment, during the DTWIN, more decoders are implemented since QoS and performance of read operations are critical. On the other hand, more encoder engines are implemented during the NDWIN since more write operations are issued.

Figure 13:
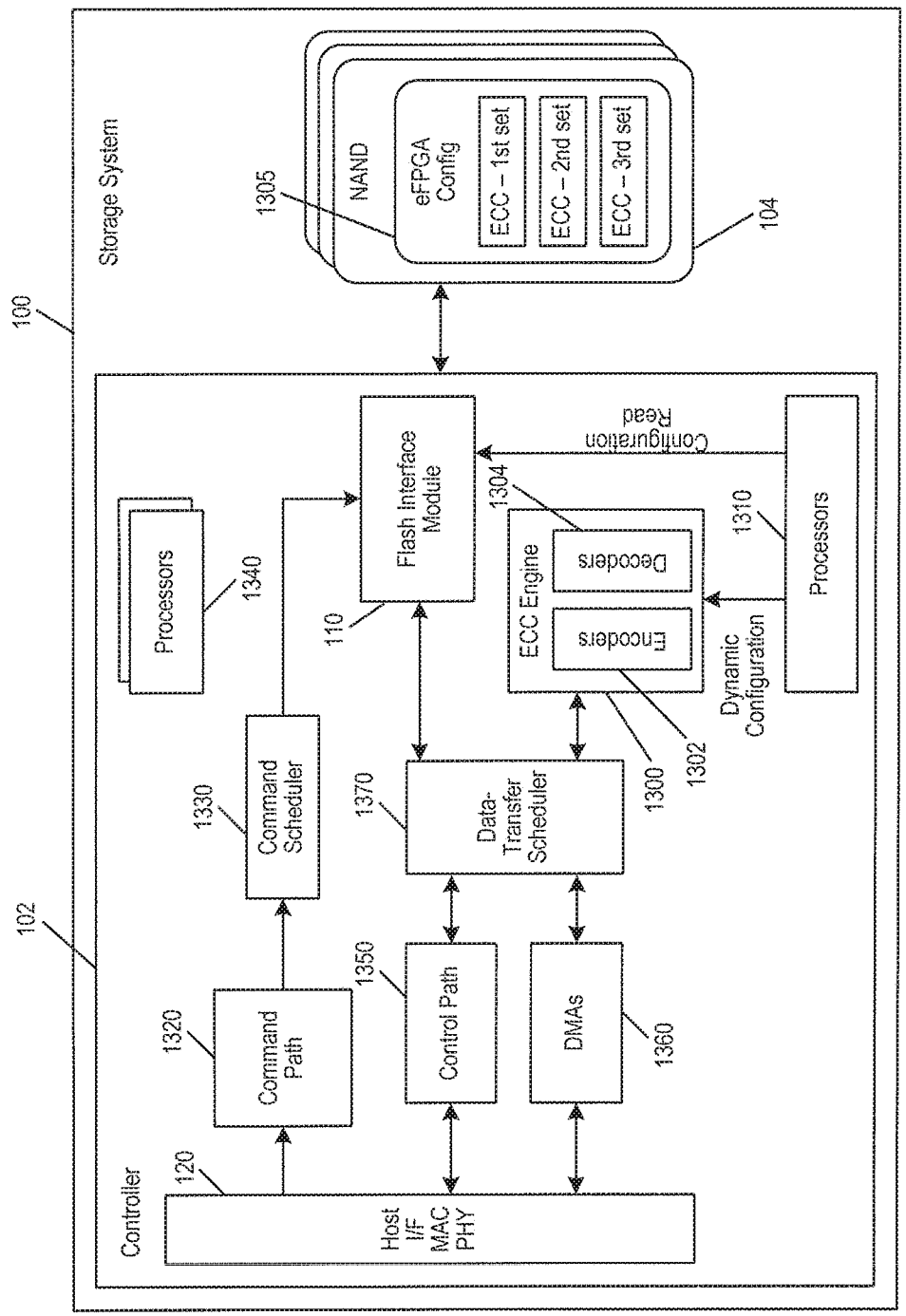
FIG. 13 is a block diagram of a storage system of an embodiment.

FIG. 13 is a block of a storage system 100 of an embodiment that can be used with the above features. As shown in FIG. 13, the storage system 100 comprises a controller 102 and a memory (here, NAND) 104. The controller 102 comprises an ECC engine 1300 with an eFPGA, which can take a form similar to the module 1000 in FIGS. 10B and 10C. The eFPGA in the ECC engine 1300 can be programmed by a processor 1310 with instructions read from an eFPGA configuration area/file 1305 in the memory 104. For example, the eFPGA configuration area/file 1305 in the memory 104 can store three different sets of instruction code to implement different ECC schemes. In operation, based on the anticipated workload, the processor 1310 issues a configuration read command to the memory 104 via the Flash interface module 110 to fetch die appropriate set of instruction code for the desired configuration and then dynamically reconfigures the eFPGA in the ECC engine 1300 with the read instructions code. The other components of the controller 102 (e.g., the command path 1320, the command scheduler 1330, other processors 1340, a control path 1350, direct memory access (DMA) modules 1360, and a data transfer scheduler 1370) would operate as they normally do.

There are many advantages associated with these embodiments. For example, die adaptive system described above allows for better utilization of the available resources, requiring less overall resources for the same performance target. Also, the adaptive system can achieve higher performance and QoS compared to the non-adaptive systems. The solution is more efficient and adapted to the current workload and burst operations. Further, these embodiments allow flexibility in the design (e.g., to support products that require different read/write profiles post tape-out).

In another embodiment, an embedded FPGA is used to provide dynamic host memory buffer (HMB)—controller memory buffer (CMB) support for the controller 102, which can be useful in a Non-Volatile Memory Express (NVMe) environment. NVMe is based on a paired Submission and Completion Queue mechanism. Commands are placed by host software into a Submission Queue, and Completions are placed into the associated Completion Queue by the controller 102. In general, Submission and Completion Queues are allocated in host memory while each queue might be physically located contiguously or non-contiguously in the host memory.

Modern high-performance SSD controllers (such as NVMe controllers) use a significant amount of RAM, and there typically is a ratio of 1 GB of RAM for every 1 TB of flash. The controllers are usually conservative about using that RAM as a cache for user data to limit the damage of a sudden power loss, and RAM is used instead to store the organizational metadata necessary for the controller to keep track of what data is stored where on the flash chips. The goal is that when the drive receives a read or write request, it can determine which flash memory location needs to be accessed based on a much quicker lookup in the controller's DRAM (as compared to flash), and the drive docs not need to update the metadata copy stored on the flash after every single write operation is completed. For fast, consistent performance, the data structures can be chosen to minimize the amount of computation and the number of RAM lookups required at the expense of requiring more RAM. As a common cost reduction, the RAM may be allocated from a shared pool on the host instead of adding onboard DRAM to the device. This feature is known as a host memory buffer (HMB) in PCIe/NVMe devices and leverages the PCIe protocol to allow direct access to host memory.

Usually, the HMB is allocated as a fixed buffer during host initialization and is fully given over to the device as a dedicated pool. The device may then directly access this buffer and treat it as an extension of its own memory. The HMB feature is very common in low-end client SSD applications hut not in other client and enterprise markets. On the other hand, the Controller Memory Buffer (CMB) and Persistent Memory Region (PMR) features are common in data centers and in enterprise markets. The CMB feature enables the host to place Submission Queues. Completion Queues, physical region page (PRP) lists, scatter gather list (SOL) segments, and data buffers in controller memory. The PMR feature is an optional region of general purpose read/write persistent memory that may be used for a variety of purposes. The address range of the PMR is defined by a PCI Base Address register (BAR) and consumes the entire address region exposed by the BAR. The PMR supports the required features of the PCI express programming model (i.e., it in no way restricts what is otherwise permitted by PCI Express). The contents of the PMR persist across PMR disables, controller and NVM subsystem resets, and power cycles.

CMB/PMR becomes a hot topic in enterprise market for the next generation since this feature has a direct impact on performance especially in a PCI Express fabric topology. In addition, it reduces the amount of storage that is implemented in the host DRAM.

HMB and CMB features are not enabled in the same application since each one of them is unique to a specific market and usually is irrelevant to the other markets. Further, the current approach to support HMB and CMB features in storage controllers for future products is based on implementing both hardware engines of HMB support, as well as CMB support. However, these working methods will probably never be done in parallel (i.e., the storage system will either operate in HMB mode or CMB mode).

The following embodiments can be used to provide configurable hardware that would not require the redundant implementation of both engines of HMB and CMB support. In one embodiment, a storage controller is provided with an embedded FPGA that can be configured to support either HMB or CMB (or neither mode) without redundant hardware to support both modes. In this way, the embedded FPGA can replace the current blocks of HMB and CMB support in a storage device controller.

Figure 14:
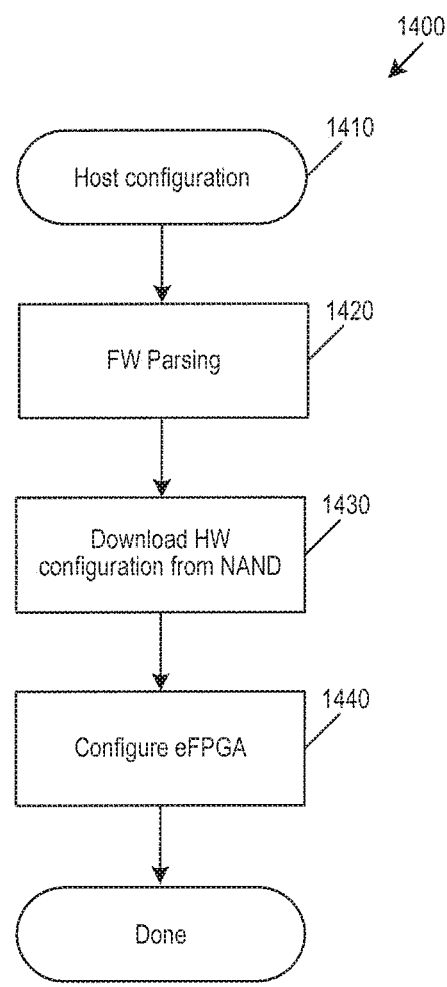
FIG. 14 is a flow chart of a method of an embodiment for providing dynamic host memory buffer (HMB)—controller memory buffer (CMB) support for a storage controller.

Returning to the drawings, FIG. 14 is a flow chart 1400 of a method of an embodiment for configuring an embedded FPGA module in the controller 102 to operate either as an HMB support module or a CMB support module. As shown in FIG. 14, the host first configures the eFPGA in the controller 102 to one of the pre-defined HMB/CMB hardware options (act 1410). In one embodiment, the host can configure the eFPGA to one of three options: (1) eFPGA HMB support, (2) eFPGA CMB support, and (3) no HMA/CMB support. In option 1, the eFPGA will be configured to a pre-defined design of a HMB support block. In option 2, the eFPGA will be configured to a pre-defined design of a CMB-support-book. In option 3, the eFPGA will be free to utilize any other hardware acceleration option, such as adding extra processing engines like ECC, encryption and decryption engines, or extra staging buffers.

Next, firmware in the controller 102 parses the host configuration instructions (act 1420) and downloads the relevant configuration from the management area of the memory 104 (act 1430). Then, the eFPGA in the controller 102 is configured to a specific hardware design according to the configuration fetched from the memory 104 (act 1440). When completing this dynamic configuration, a done notification can be posted to the host.

In another embodiment, the eFPGA module can lie tuned to implement various flavors of either HMB or CMB support modules, including, but not limited to, HMB/CMB size, HMB contiguous or non-contiguous buffers (non-contiguous is more complex since the host may provide many non-contiguous buffers that represent the entire HMB), CMB usage (e.g., host submission queues, host completion queues, write user-data, read user-data, and PRP/SGL), and HMB/CMB performance/latency.

Figure 15:
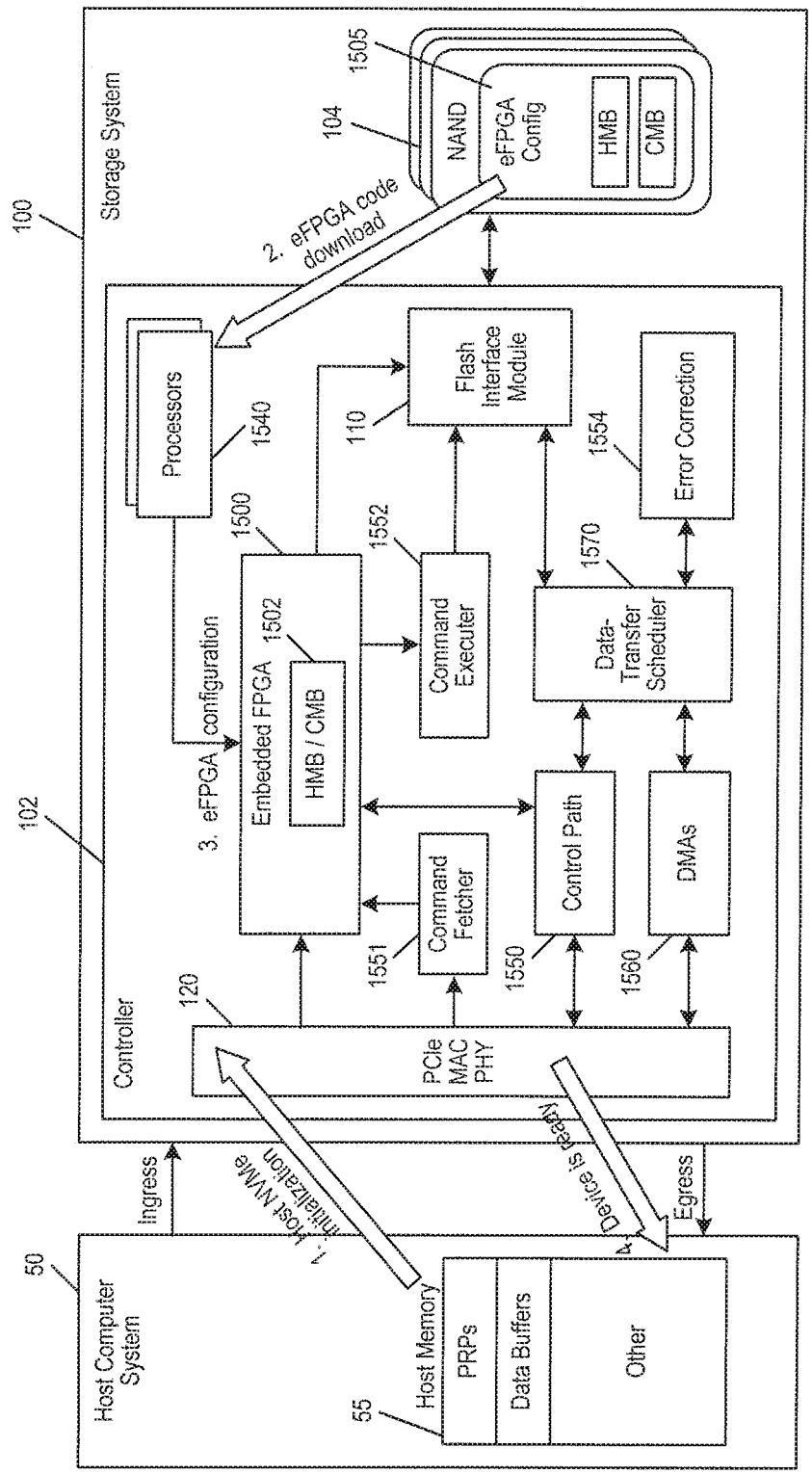
FIG. 15 is a block diagram of a storage system of an embodiment.

Turning again to the drawings. FIG. 15 is a block diagram of a storage system 100 of an embodiment that can be used to provide an eFPGA HMB/CMB configurable device. As shown in FIG. 15, the storage system 100 comprises a controller 102 and a memory (here, NAND) 104. The controller 102 comprises an eFPGA 1500, which can be programmed by a processor 1540 with instructions read from an eFPGA configuration area/file 1505 in the memory 104. For example, the eFPGA configuration area/file 1505 in the memory 104 can store instruction code to implement an HMB and instruction code to implement a CMB. In operation, basal installation instructions from a host 50 (which has host memory 55), live processor 1510 issues a configuration read command to the memory 104 via the Flash interface module 110 to fetch appropriate instruction code and then dynamically reconfigures the eFPGA 1500 with the read instruction code. The other components of the controller 102 (e.g., the control path 1550, the command fetcher 1551, the command executer 1552, the direct memory access (DMA) modules 1560, the data transfer scheduler 1570, and the error correction block 1554) would operate as they normally do.

There are many advantages associated with these embodiments. For example, by using a single configurable eFPGA module to replace two different hardware modules of HMB and CMB supporting blocks, these embodiments can reduce the price of the controller ASIC, provide design flexibility to configure the HMB/CMB uses to different values flavors during the device's lifetime, and shorten the time to market (achieved by a higher bug immunity that is achieved by the option to re-configure the HMB/CMB support modules even after tape-out).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a HAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory a nays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can lake and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system, comprising:
    a memory configured to store a plurality of sets of instruction code, wherein each set is for a different error decoder implementation; and
    a controller configured to:
        select one of the sets of instruction code;
        read the instruction code of the selected set from the memory; and
        program the controller with the instruction code of the selected set, wherein the controller implements the error decoder specified in the instruction code of the selected set.

2. The storage system of claim 1, wherein the selected set is selected based on a bit error rate or an estimation of the bit error rate.

3. The storage system of claim 1, wherein the selected set is selected based on a program/erase count.

4. The storage system of claim 1, wherein the selected set is selected based on a command from a host.

5. The storage system of claim 1, wherein the controller comprises a field programmable gate array.

6. The storage system of claim 1, wherein the memory comprises a three-dimensional memory.

7. The storage system of claim 1, wherein the controller is either programmed only once to support a specific product configuration or programmed a plurality of times throughout a lifetime of the storage system.

8. In a storage system including a controller and a memory configured to store a plurality of sets of instruction code, wherein each set is for a different error decoder implementation, a method comprising:
    selecting one of the sets of instruction code;
    reading the instruction code of the selected set from the memory; and
    programing the controller with the instruction code of the selected set, wherein the controller implements the error decoder specified in the instruction code of the selected set.

9. The method of claim 8, wherein the selected set is selected based on a bit error rate or an estimation of the bit error rate.

10. The method of claim 8, wherein the selected set is selected based on a program/erase count.

11. The method of claim 8, wherein the selected set is selected based on a command from a host.

12. The method of claim 8, wherein the controller comprises a field programmable gate array.

13. The method of claim 8, wherein the memory comprises a three-dimensional memory.

14. The method of claim 8, wherein the controller is either programmed only once to support a specific product configuration or programmed a plurality of times throughout a lifetime of the storage system.

15. A storage system, comprising:
    a memory configured to store a plurality of sets of instruction code, wherein each set is for a different error decoder implementation; and
    a controller means for:
        selecting one of the sets of instruction code;
        reading the instruction code of the selected set from the memory; and programing the controller means with the instruction code of the selected set, wherein the controller means implements the error decoder specified in the instruction code of the selected set.

16. The storage system of claim 15, wherein the selected set is selected based on a bit error rate or an estimation of the bit error rate.

17. The storage system of claim 15, wherein the selected set is selected based on a program/erase count.

18. The storage system of claim 15, wherein the selected set is selected based on command from a host.

19. The storage system of claim 15, wherein the controller means comprises a field programmable gate array.

20. The storage system of claim 15, wherein the controller means is either programmed only once to support a specific product configuration or programmed a plurality of times throughout a lifetime of the storage system.

* * * * *